(12) United States Patent
Yokota

(10) Patent No.: US 11,373,073 B2
(45) Date of Patent: Jun. 28, 2022

(54) IMAGE FORMING APPARATUS FOR PERFORMING PRINTING ON PAPER

(71) Applicant: KYOCERA Document Solutions Inc., Osaka (JP)

(72) Inventor: Hiroshi Yokota, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 18 days.

(21) Appl. No.: 17/106,476

(22) Filed: Nov. 30, 2020

(65) Prior Publication Data

US 2021/0182637 A1 Jun. 17, 2021

(30) Foreign Application Priority Data

Dec. 16, 2019 (JP) .............................. JP2019-226659

(51) Int. Cl.
*G06K 15/00* (2006.01)
*G06K 15/02* (2006.01)

(52) U.S. Cl.
CPC ....... *G06K 15/4065* (2013.01); *G06K 15/002* (2013.01); *G06K 15/021* (2013.01)

(58) Field of Classification Search
None
See application file for complete search history.

(56) References Cited

U.S. PATENT DOCUMENTS

| 2002/0063875 | A1* | 5/2002 | Yoshikawa | G06K 15/00 |
| | | | | 358/1.12 |
| 2009/0009803 | A1* | 1/2009 | Takeuchi | H04N 1/00644 |
| | | | | 358/1.15 |
| 2013/0148156 | A1* | 6/2013 | Teraue | G06F 3/1285 |
| | | | | 358/1.15 |
| 2020/0004472 | A1* | 1/2020 | Kimura | G06F 3/1255 |

FOREIGN PATENT DOCUMENTS

JP 2005-148496 6/2005

* cited by examiner

*Primary Examiner* — Mohammad H Ghayour
*Assistant Examiner* — Pawan Dhingra
(74) *Attorney, Agent, or Firm* — Lex IP Meister, PLLC

(57) ABSTRACT

An image forming apparatus includes a reader configured to read a paper used for printing, a controller configured to generate paper information indicating the type of paper read by the reader, and a storage unit configured to store the paper information in association with history information of a paper. The controller updates history information corresponding to target paper information when the target paper information indicating a same type of paper as the paper indicated by newly generated paper information is stored, and causes the storage unit to store the newly generated paper information when the target paper information is not stored. The controller searches for paper information indicating the type of paper input in a search operation, and causes an operation panel to display the history information corresponding to the found paper information.

14 Claims, 9 Drawing Sheets

IMAGE FORMING APPARATUS FOR PERFORMING PRINTING ON PAPER

INCORPORATION BY REFERENCE

This application is based upon, and claims the benefit of priority from, corresponding Japanese Patent Application No. 2019-226659 filed in the Japan Patent Office on Dec. 16, 2019, the entire contents of which are incorporated herein by reference.

BACKGROUND

Field of the Invention

The present disclosure relates to an image forming apparatus that performs printing on a paper.

Description of Related Art

An image forming apparatus that performs printing on a paper is equipped with a paper cassette for accommodating a paper used for printing.

Typically, an image forming apparatus equipped with a plurality of paper cassettes can accommodate different types (sizes) of paper in the plurality of paper cassettes. For example, when using a B4 plain paper for printing, a user selects a paper cassette containing B4 plain papers as the paper source. When using a thick paper for printing, the user selects a paper cassette containing thick papers as the paper source.

SUMMARY

The image forming apparatus of the present disclosure includes an operation panel, a printer configured to perform printing on a paper, a reader configured to read a paper used for printing, a controller configured to, when the reader reads a paper, determine a type of paper read by the reader on a basis of read data obtained by reading the paper by the reader, and to generate paper information indicating the type of paper read by the reader, and a storage unit configured to store the paper information in association with history information indicating a usage history of a paper indicated by the paper information. The controller determines whether target paper information which is paper information indicating a same type of paper as the paper indicated by the newly generated paper information is stored in the storage unit, and updates the history information corresponding to the target paper information when the target paper information is stored, and when the target paper information is not stored, causes the storage unit to store the newly generated paper information in association with the new history information indicating the usage history of the paper indicated by the newly generated paper information. The operation panel accepts a search operation for inputting a type of paper from the user. The controller performs a search process of searching the storage unit for the paper information indicating the type of paper input in the search operation, and causes the operation panel to display the history information corresponding to the paper information found in the search process.

DETAILED DESCRIPTION

Configuration of Image Forming Apparatus

Figure 1:
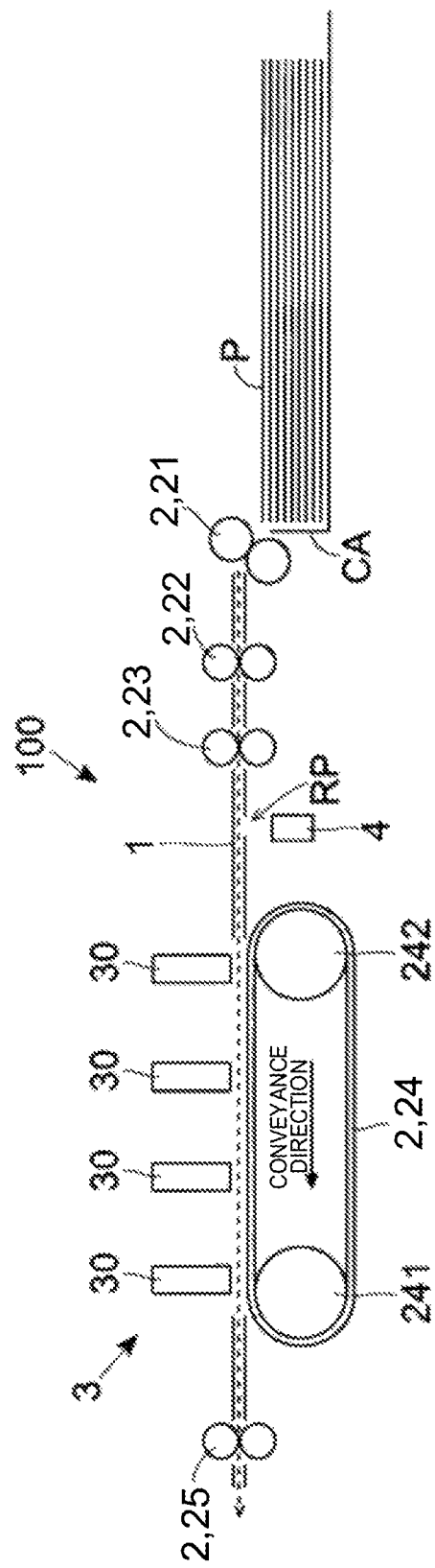
FIG. 1 is a schematic diagram illustrating a configuration of an image forming apparatus of the present embodiment.

As illustrated in FIG. 1, an image forming apparatus 100 of the present embodiment includes a paper conveyance path 1. The paper conveyance path 1 reaches an ejection tray (not illustrated) from a paper cassette CA via a print area. The image forming apparatus 100 conveys a paper P along the paper conveyance path 1 and executes a print job for printing an image on the paper P being conveyed. In FIG. 1, the dashed arrow indicates the conveyance path of the paper P that is conveyed along the paper conveyance path 1.

The image forming apparatus 100 includes a conveyer 2. The conveyer 2 conveys the paper P along the paper conveyance path 1.

The conveyer 2 includes a paper feed roller pair 21 and a paper feed side conveyance roller pair 22. The paper feed roller pair 21 pulls out the paper P from the paper cassette CA and feeds the paper P into the paper conveyance path 1. The paper feed side conveyance roller pair 22 conveys the paper P fed into the paper conveyance path 1. The number of paper feed side conveyance roller pairs 22 installed is not particularly limited.

The conveyer 2 includes a resist roller pair 23. The resist roller pair 23 is installed on the upstream side in the paper conveyance direction of the print area. The resist roller pair 23 conveys the paper P toward the print area.

When the paper P reaches the resist roller pair 23, the resist roller pair 23 stops rotating. This temporarily stops the conveyance of the paper P. At this time, the skew of the paper P is corrected. The resist roller pair 23 stops the conveyance of the paper P until a preliminarily specified skew correction time elapses, and then starts the conveyance of the paper P.

The conveyer 2 includes a conveyance belt 24. The conveyance belt 24 conveys the paper P in the print area. The conveyance belt 24 is an endless belt. The conveyance belt 24 is stretched by a drive roller 241 and a driven roller 242. The conveyance belt 24 goes round as the drive roller 241 rotates.

The paper P sent from the resist roller pair 23 reaches the conveyance belt 24. When the paper P reaches the conveyance belt 24, the conveyance belt 24 goes around. As a result, the paper P on the conveyance belt 24 is conveyed. Although not illustrated, a suction hole is formed in the conveyance belt 24 so as to penetrate in the thickness direction of the conveyance belt 24. In addition, a suction unit is installed inside the conveyance belt 24. The suction unit sucks the paper P on the conveyance belt 24 by generating a negative pressure.

The conveyer 2 includes an ejection side conveyance roller pair 25. The ejection side conveyance roller pair 25 conveys the paper P sent from the conveyance belt 24 toward the ejection tray. The number of ejection side conveyance roller pairs 25 installed is not particularly limited.

In addition, the image forming apparatus 100 includes a printer 3. The printer 3 is disposed above the conveyance belt 24 at a specific distance from the outer peripheral surface of the conveyance belt 24. The printer 3 discharges ink toward the conveyance belt 24 when the conveyance belt 24 is conveying the paper P (when the paper P is in the print area). The ink discharged from the printer 3 lands on the paper P on the conveyance belt 24. As a result, an image is printed on the paper P.

The printer 3 includes four ink heads 30 corresponding to cyan, magenta, yellow and black, respectively. The four ink heads 30 each contain ink of a corresponding color. The four ink heads 30 each include a plurality of nozzles 31 (see FIG. 2). In other words, each of the four ink heads 30 includes a nozzle surface provided with a plurality of nozzles 31. Piezoelectric elements (not illustrated) are provided on each nozzle 31 of the four ink heads 30. The four ink heads 30 each discharge ink of the corresponding color from the nozzle 31.

Each nozzle surface of the four ink heads 30 is directed downward. Each of the four ink heads 30 is disposed in such a manner that the nozzle surface faces the outer peripheral surface of the conveyance belt 24 at a specific distance. In addition, the four ink heads 30 are spaced apart from one another in the conveyance direction.

In addition, the image forming apparatus 100 includes a reader 4. The reader 4 reads a reading target by a CIS (Contact Image Sensor) method. The reader 4 includes an image sensor 40 (see FIG. 2). The light receiving elements of the image sensor 40 are arranged in a direction orthogonal to the paper conveyance direction. That is, the main scanning direction of reading by the reader 4 is the same as the main scanning direction of printing by the printer 3.

The reader 4 sets a reading position at a specific position RP on the more upstream side in the paper conveyance direction than the print area in the paper conveyance path 1. At the reading position RP, the reader 4 reads the paper P being conveyed for each line orthogonal to the paper conveyance direction.

Figure 2:
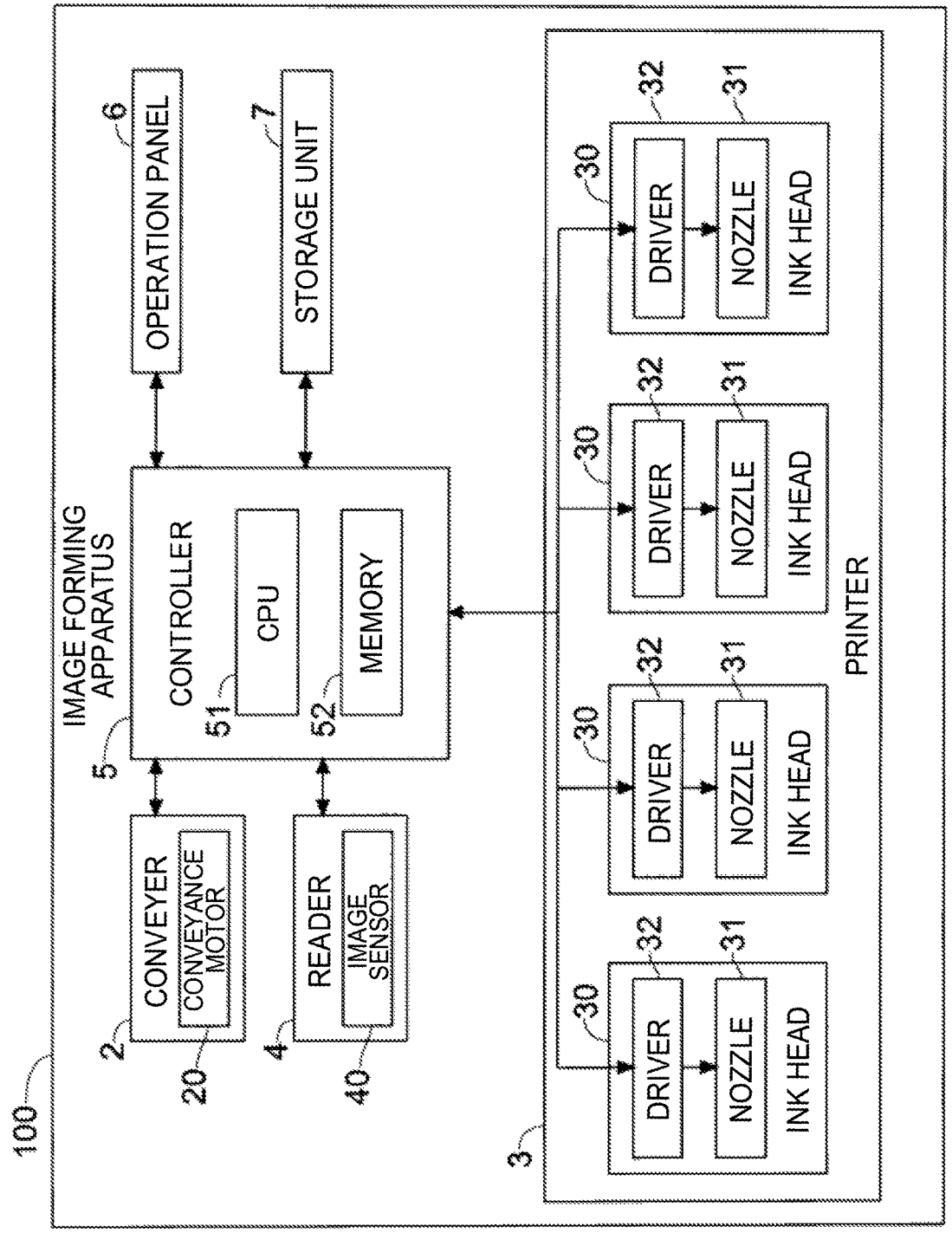
FIG. 2 is a block diagram illustrating a configuration of the image forming apparatus of the present embodiment.

In addition, as illustrated in FIG. 2, the image forming apparatus 100 includes a controller 5. The controller 5 controls the entire image forming apparatus 100. In addition, the controller 5 performs various image processing on the image data of the image to be printed on the paper P.

The controller 5 includes a CPU 51 and a memory 52. The CPU 51 operates on the basis of a control program and control data. The memory 52 includes a ROM and a RAM. The control program and the control data are stored in the ROM and developed in the RAM.

The controller 5 is connected to a conveyance motor 20 that rotates various rollers of the conveyer 2. The controller 5 controls the conveyance motor 20. In FIG. 2, only one conveyance motor 20 is illustrated. However, the number of the conveyance motors 20 installed is not particularly limited.

The controller 5 is connected to a driver 32 of the printer 3. The driver 32 is provided on each ink head 30. The controller 5 controls the driver 32 of each ink bed 30 (controls the print operation of each ink head 30).

Specifically, the controller 5 generates a control signal indicating a nozzle 31 (here, referred to as a discharge nozzle 31) for discharging ink, for each ink head 30. Then, the controller 5 transmits the control signal to the driver 32 of each ink head 30. The driver 32 of each ink head 30 performs an ink discharge process on the basis of the control signal. The controller 5 controls the conveyance of the paper P in such a manner that the paper P advances by the width of one line (1 dot) each time the ink discharge process is performed.

The driver 32 of each ink head 30 performs, as the ink discharge process, a process of applying a drive voltage to the piezoelectric element provided in the discharge nozzle 31 indicated by the control signal. As a result, the nozzle 31 corresponding to the piezoelectric element to which the drive voltage has been applied is driven (ink is discharged from the nozzle 31).

The controller 5 is connected to the reader 4. The controller 5 controls the reading operation of the reader 4. The controller 5 causes the reader 4 to read from the start to the completion of printing. The controller 5 acquires the read data of the paper P obtained by reading by the reader 4. That is, the controller 5 acquires the read data of the paper P used for printing by the printer 3 (paper P immediately before printing by the printer 3).

The controller 5 amplifies an analog signal output from the reader 4 and converts the signal into digital read data. The controller 5 performs image processing such as shading correction processing on the read data, binarizes the read data, and performs expansion/contraction processing on the binarized read data. The controller 5 determines the type of paper P used for printing on the basis of the binarized read data. The details will be described later.

In addition, the image forming apparatus 100 includes an operation panel 6. The operation panel 6 accepts settings and instructions related to printing from the user. The operation panel 6 includes a touch screen. The touch screen displays a screen for accepting settings and instructions related to printing.

The operation panel 6 is connected to the controller 5. The controller 5 controls the display operation of the operation panel 6. In addition, the controller 5 detects an operation performed on the operation panel 6.

Furthermore, the image forming apparatus 100 includes a storage unit 7. The storage unit 7 is a non-volatile storage device. For example, the storage unit 7 is an HDD.

Type Determination Process

The controller 5 performs a type determination process for determining the type of paper P used for printing during printing by the printer 3. The controller 5 determines the type of all papers P conveyed toward the print area one by one. When the number of print sheets of a print job is multiple, the type is determined for each of the multiple sheets of paper P.

The controller 5 determines the type of paper P used for printing on the basis of the read data obtained by reading the paper P by the reader 4. For example, the controller 5 acquires the read data of the paper P from the reader 4 when the reader 4 reads the paper P (when the paper P passes through the reading position RP). Then, in parallel with the reading of the paper P by the reader 4, the controller 5 performs the type determination process on the paper P being read by the reader 4.

As the type determination process, the controller 5 performs a process of determining whether the paper P to be determined (hereinafter referred to as a target paper P) is a plain paper. The controller 5 determines a paper P in which no tabs and punch holes are formed as a plain paper.

Figure 3:
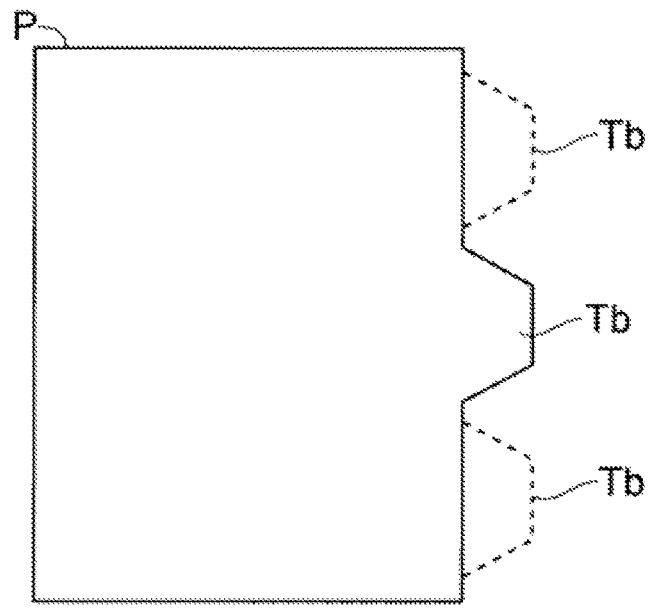
FIG. 3 is a diagram illustrating a paper (index paper) used in the image forming apparatus of the present embodiment.

In addition, the controller 5 performs a process of determining whether the target paper P is an index paper as the type determination process. The controller 5 determines a paper P (paper P having a tab Tb) such as that illustrated in FIG. 3 as an index paper. FIG. 3 illustrates one of the index paper sets including three index papers. The tab Tb indicated by the broken line is formed on the other two index papers. The number of tabs (the number of tab TBs) of the index paper set including the index paper illustrated in FIG. 3 is three.

Figure 4:
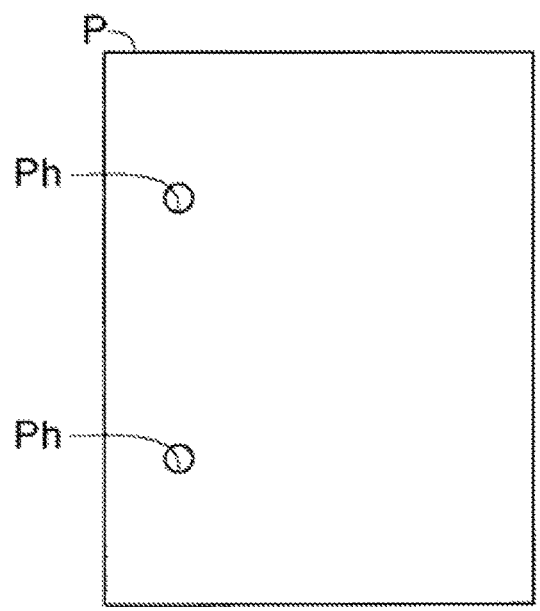
FIG. 4 is a diagram illustrating a paper (punch paper) used in the image forming apparatus of the present embodiment.

Moreover, the controller 5 performs a process of determining whether the target paper P is a punch paper (paper P with punch holes) as the type determination process. The controller 5 determines a paper P such as that illustrated in FIG. 4 (paper P having a punch hole Ph) as a punch paper. FIG. 4 illustrates a punch paper with two punch holes Ph formed. A paper with only one punch hole Ph may also be determined as a punch paper. Furthermore, a paper P having punch holes Ph formed respectively in the area on one end side of the paper P and the area on the other end side opposite to the area may also be determined as a punch paper.

In some cases, a paper P having both a tab Tb and a punch hole Ph is used for printing. In this case, the controller 5 determines the paper P as a tabbed punch paper.

In addition, the controller 5 performs a process of determining the size (the width in the main scanning direction and the width in the sub-scanning direction) of the target paper P as the type determination process.

The type determination process will be specifically described below.

Figure 5:
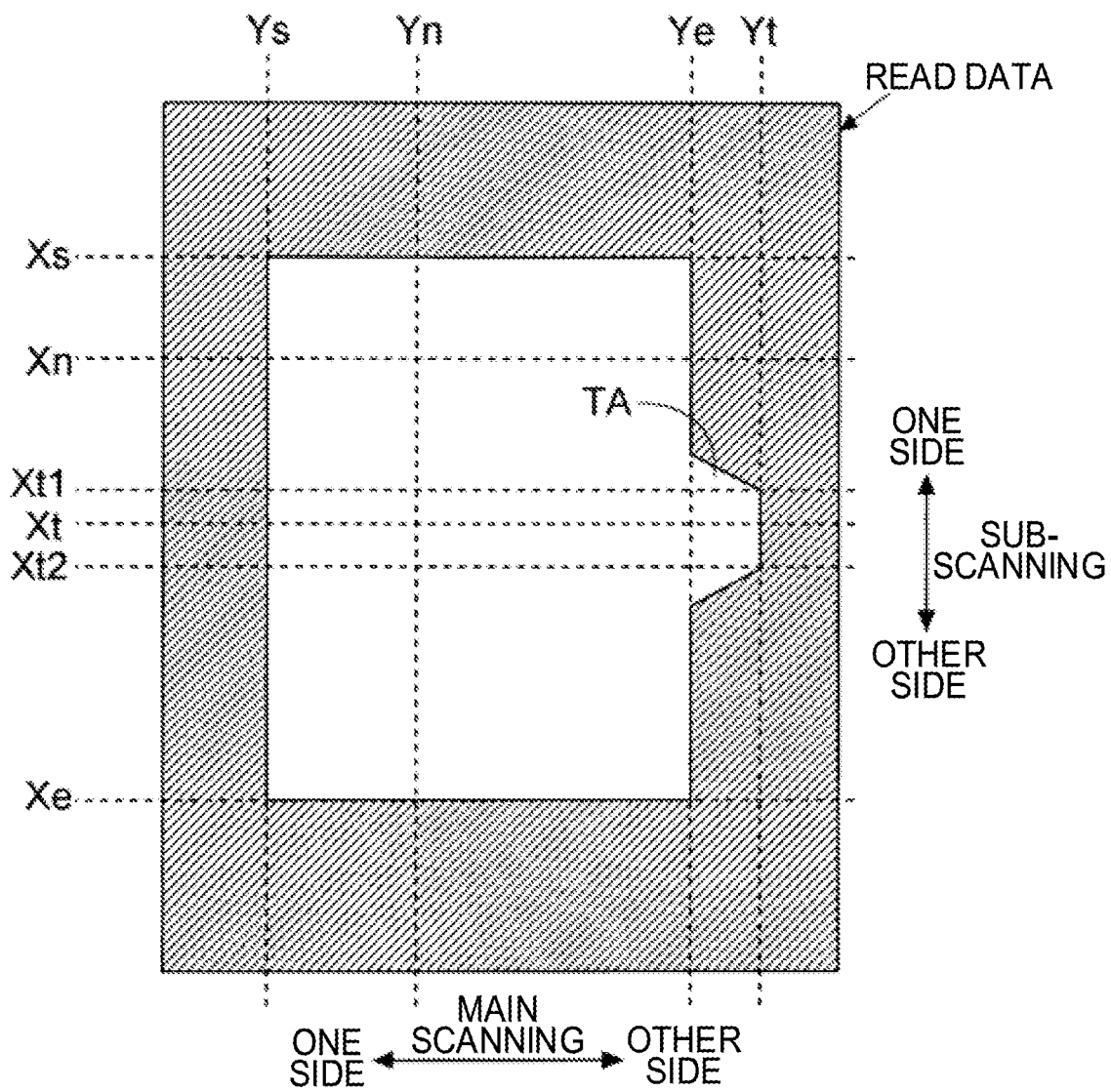
FIG. 5 is a diagram for explaining a type determination process performed by a controller of the image forming apparatus of the present embodiment.
Figure 6:
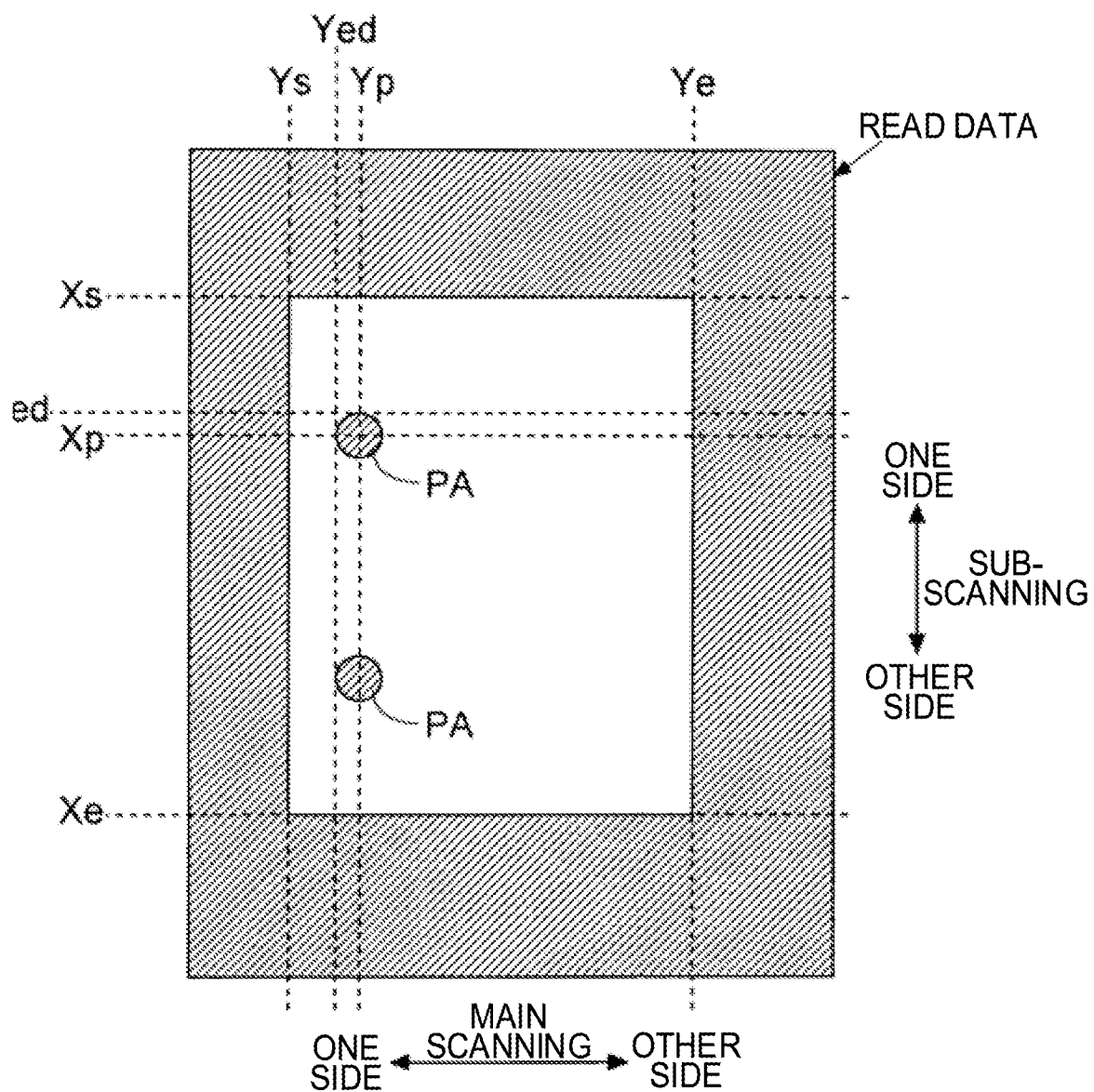
FIG. 6 is a diagram for explaining the type determination process performed by the controller of the image forming apparatus of the present embodiment.

The controller 5 acquires the read data of the target paper P from the reader 4 in order to perform the type determination process. Examples of the read data are illustrated in FIGS. 5 and 6. FIG. 5 illustrates the read data when the target paper P is an index paper. FIG. 6 illustrates the read data when the target paper P is a punch paper.

In the following description, the left side in the main scanning direction (direction orthogonal to the paper conveyance direction) is referred to as one side, and the right side in the main scanning direction is referred to as the other side. In addition, the downstream side in the paper conveyance direction in the sub-scanning direction (paper conveyance direction) is referred to as one side, and the upstream side in the paper conveyance direction in the sub-scanning direction is referred to as the other side.

First, the controller 5 binarizes the read data of the target paper P into black and white. As a result, a paper area corresponding to the paper P and an out-of-paper area outside the paper P are clearly distinguished from each other in the read data. In FIGS. 5 and 6, the paper area is illustrated in white and the out-of-paper area is illustrated in hatching.

After binarizing the read data, the controller 5 detects an edge pixel, which is a pixel in the paper area and corresponds to an edge of the target paper P, from the read data of the target paper P. That is, the controller 5 detects the pixels that form the outline of the target paper P from the read data of the target paper P. The controller 5 recognizes the size of the target paper P on the basis of a plurality of edge pixels detected from the read data. If a punch hole Ph is formed in the target paper P, the controller 5 also detects the pixel forming the outline of the punch hole Ph as the edge pixel.

For each of the plurality of main scanning pixel lines extending in the main scanning direction in the read data, the controller 5 recognizes a main scanning one-side pixel which is the edge pixel located farthest to one side in a main scanning direction and a main scanning other-side pixel which is the edge pixel located farthest to other side in the main scanning direction. In addition, for each of the plurality of sub-scanning pixel lines extending in the sub-scanning direction in the read data, the controller 5 recognizes a sub-scanning one-side pixel which is the edge pixel located farthest to one side in a sub-scanning direction and a sub-scanning other-side pixel which is the edge pixel located farthest to the other side in the sub-scanning direction.

In the example illustrated in FIG. 5, focusing on a main scanning pixel line Xn, the edge pixel located at the intersection of the main scanning pixel line Xn and a sub-scanning pixel line Ys is recognized as the main scanning one-side pixel, and the edge pixel located at the intersection of the main scanning pixel line Xn and a sub-scanning pixel line Ye is recognized as the main scanning other-side pixel. Focusing on a main scanning pixel line Xt, the edge pixel located at the intersection of the main scanning pixel line Xt and the sub-scanning pixel line Ys is recognized as the main scanning one-side pixel, and the edge pixel located at the intersection of the main scanning pixel line Xt and a sub-scanning pixel line Yt is recognized as the main scanning other-side pixel.

Moreover, in the example illustrated in FIG. 5, focusing on a sub-scanning pixel line Yn, the edge pixel located at the intersection of the sub-scanning pixel line Yn and a main scanning pixel line Xs is recognized as the sub-scanning one-side pixel, and the edge pixel located at the intersection of the sub-scanning pixel line Yn and a main scanning pixel line Xe is recognized as the sub-scanning other-side pixel. Focusing on the sub-scanning pixel line Yt, the edge pixel located at the intersection of the sub-scanning pixel line Yt and a main scanning pixel line Xt1 is recognized as the sub-scanning one-side pixel, and the edge pixel located at the intersection of the sub-scanning pixel line Yt and a main scanning pixel line Xt2 is recognized as the sub-scanning other-side pixel.

In the example illustrated in FIG. 6, focusing on a main scanning pixel line Xp, the edge pixel located at the intersection of the main scanning pixel line Xp and the sub-scanning pixel line Ys is recognized as the main scanning one-side pixel, and the edge pixel located at the intersection of the main scanning pixel line Xp and the sub-scanning pixel line Ye is recognized as the main scanning other-side pixel. The main scanning pixel line Xp includes the edge pixel forming the outline of the punch hole Ph. However, the edge pixel is not recognized as the main scanning one-side pixel and the main scanning other-side pixel. This is because the edge pixel located farthest to one side in the main scanning direction is recognized as the main scanning one-side pixel, and the edge pixel located farthest to the other side in the main scanning direction is recognized as the main scanning other-side pixel.

In the example illustrated in FIG. 6, focusing on a sub-scanning pixel line Yp, the edge pixel located at the intersection of the sub-scanning pixel line Yp and the main scanning pixel line Xs is recognized as the sub-scanning one-side pixel, and the edge pixel located at the intersection of the sub-scanning pixel line Yp and the main scanning pixel line Xe is recognized as the sub-scanning other-side pixel. The sub-scanning pixel line Yp includes the edge pixel forming the outline of the punch hole Ph. However, the edge pixel is not recognized as the sub-scanning one-side pixel and the sub-scanning other-side pixel. This is because the edge pixel located farthest to one side in the sub-scanning direction is recognized as the sub-scanning one-side pixel, and the edge pixel located farthest to the other side in the sub-scanning direction is recognized as the sub-scanning other-side pixel.

Here, the type determination process includes a first process and a second process. The first process is a process for determining whether the target paper P is an index paper. The second process is a process for determining whether the target paper P is a punch paper. The first process includes a process of determining the number of tabs on an index paper set, and the second process includes a process of determining the number of punch holes and the punch hole positions of the punch paper. The details will be described below.

1. First Process

For each of the plurality of main scanning pixel lines in the read data, the controller 5 recognizes the number of first main scanning pixels, which is the number of pixels from the main scanning one-side pixel to the main scanning other-side pixel. In addition, for each of the plurality of sub-scanning pixel lines in the read data, the controller 5 recognizes the number of first sub-scanning pixels, which is the number of pixels from the sub-scanning one-side pixel to the sub-scanning other-side pixel.

For example, in the main scanning pixel line Xt illustrated in FIG. 5, the number of pixels from the pixel located farthest to one side in the main scanning direction (the pixel located on an end in one side in the main scanning direction of the read data) up to the pixel adjacent to the main scanning one-side pixel in one side in the main scanning direction is Nx1. In addition, the number of pixels from the pixel located farthest to one side in the main scanning direction (the pixel located on an end in one side in the main scanning direction of the read data) up to the main scanning other-side pixel is Nx2. In this case, the number of first main scanning pixels of the main scanning pixel line Xt illustrated in FIG. 5 is the number of pixels obtained by subtracting Nx1 from Nx2. The number of first main scanning pixels of the main scanning pixel line Xn illustrated in FIG. 5 is smaller than the number of first main scanning pixels of the main scanning pixel line Xt (=Nx2−Nx1) illustrated in FIG. 5.

In addition, in the sub-scanning pixel line Yt illustrated in FIG. 5, the number of pixels from the pixel located farthest to one side in the sub-scanning direction (the pixel located on an end in one side in the sub-scanning direction of the read data) up to the pixel adjacent to the sub-scanning one-side pixel in one side in the sub-scanning direction is Ny1. Moreover, the number of pixels from the pixel located farthest to one side in the sub-scanning direction (the pixel located on an end in one side in the sub-scanning direction of the read data) up to the sub-scanning other-side pixel is Ny2. In this case, the number of first sub-scanning pixels of the sub-scanning pixel line Yt illustrated in FIG. 5 is the number of pixels obtained by subtracting Ny1 from Ny2. The number of first sub-scanning pixels of the sub-scanning pixel line Yn illustrated in FIG. 5 is larger than the number of the pixels of the sub-scanning pixel line Yt (=Ny2−Ny1) illustrated in FIG. 5.

In the main scanning pixel line Xp illustrated in FIG. 6, the number of pixels from the pixel located farthest to one side in the main scanning direction (the pixel located on an end in one side in the main scanning direction of the read data) up to the pixel adjacent to the main scanning one-side pixel in one side in the main scanning direction is Nx3. In addition, the number of pixels from the pixel located farthest to one side in the main scanning direction (the pixel located on an end in one side in the main scanning direction of the read data) up to the main scanning other-side pixel is Nx4. In this case, the number of first main scanning pixels of the main scanning pixel line Xp illustrated in FIG. 6 is the number of pixels obtained by subtracting Nx3 from Nx4. Ideally, the number of first main scanning pixels of each of the plurality of main scanning pixel lines in the read data illustrated in FIG. 6 is the same.

In the sub-scanning pixel line Yp illustrated in FIG. 6, the number of pixels from the pixel located farthest to one side in the sub-scanning direction (the pixel located on an end in one side in the sub-scanning direction of the read data) up to the pixel adjacent to the sub-scanning one-side pixel in one side in the sub-scanning direction is Ny3. In addition, the number of pixels from the pixel located farthest to one side in the sub-scanning direction (the pixel located on an end in one side in the sub-scanning direction of the read data) up to the sub-scanning other-side pixel is Ny4. In this case, the number of first sub-scanning pixels of the sub-scanning pixel line Yp illustrated in FIG. 6 is the number of pixels obtained by subtracting Ny3 from Ny4. Ideally, the number of first sub-scanning pixels of each of the plurality of sub-scanning pixel lines in the read data illustrated in FIG. 6 is the same.

After recognizing the number of first main scanning pixels, the controller 5 selects a specific number of main scanning pixel lines (for example, the specific number is 16) in descending order of the number of first main scanning pixels, and obtains a main scanning greater-number-side side average value by averaging the number of first main scanning pixels of the selected specific number of main scanning pixel lines. Furthermore, the controller 5 selects a specific number of main scanning pixel lines (for example, the specific number is 16) in ascending order of the number of first main scanning pixels, and obtains a main scanning lesser-number-side average value by averaging the number of first main scanning pixels of the selected specific number of main scanning pixel lines.

In addition, after recognizing the number of first sub-scanning pixels, the controller 5 selects a specific number of sub-scanning pixel lines (for example, the specific number is 16) in descending order of the number of first sub-scanning pixels, and obtains a sub-scanning greater-number-side side average value by averaging the number of first sub-scanning pixels of the selected specific number of sub-scanning pixel lines. Furthermore, the controller 5 selects a specific number of sub-scanning pixel lines (for example, the specific number is 16) in ascending order of the number of first sub-scanning pixels, and obtains a sub-scanning lesser-number-side average value by averaging the number of first sub-scanning pixels of the selected specific number of sub-scanning pixel lines.

In the example illustrated in FIG. 5, as a main scanning pixel line having a large number of first main scanning pixels, a main scanning pixel line (the main scanning pixel line Xt, etc.) that passes through a tab area TA corresponding to a tab Tb in the read data is selected. As a main scanning pixel line having a small number of first main scanning pixels, a main scanning pixel line that does not pass through the tab area TA (for example, the main scanning pixel line Xn) is selected.

In addition, in the example illustrated in FIG. 5, as a sub-scanning pixel line having a small number of first sub-scanning pixels, a sub-scanning pixel line (the sub-scanning pixel line Yt, etc.) that passes through the tab area TA is selected. As a sub-scanning pixel line having a large number of first sub-scanning pixels, a sub-scanning pixel line that does not pass through the tab area TA (for example, the sub-scanning pixel line Yn) is selected.

After obtaining each average value, the controller 5 obtains a value by subtracting the main scanning lesser-number-side average value from the main scanning greater-number-side side average value (here, referred to as a main scanning subtraction value). In addition, the controller 5 obtains a value by subtracting the sub-scanning lesser-number-side average value from the sub-scanning greater-number-side side average value (here, referred to as a sub-scanning subtraction value).

Here, when the target paper P is an index paper (see FIG. 3), the read data such as that as illustrated in FIG. 5 can be obtained. That is, the tab area TA appears in the read data. When the tab area TA is present in the read data, the difference between the main scanning greater-number-side side average value and the main scanning lesser-number-side average value is larger than when the tab area TA is not present. In addition, the difference between the sub-scanning greater-number-side side average value and the sub-scanning lesser-number-side average value is large. When the tab area TA is not present in the read data, the difference between the main scanning greater-number-side average value and the main scanning lesser-number-side average value is small (there is almost no difference). Moreover, the difference between the sub-scanning greater-number-side average value and the sub-scanning lesser-number-side average value is small (there is almost no difference).

Accordingly, when the main scanning subtraction value and the sub-scanning subtraction value are respectively larger than preliminarily specified threshold values, the controller 5 determines that the type of the target paper P is an index paper. When at least one of the main scanning subtraction value and the sub-scanning subtraction value is equal to or less than a threshold value, the controller 5 does not determine that the type of the target paper P is an index paper.

When determining that the target paper P is an index paper, the controller 5 determines the number of tabs of the index paper set including the target paper P (index paper). Specifically, the controller 5 obtains a value (here, referred to as a main scanning division value) obtained by dividing the main scanning greater-number-side average value by the main scanning lesser-number-side average value. In addition, the controller 5 obtains a value (here, referred to as a sub-scanning division value) obtained by dividing the sub-scanning greater-number-side average value by the sub-scanning lesser-number-side average value.

Here, as illustrated in FIG. 3, the index paper set having the number of tabs N (N=3 in the example illustrated in FIG. 3) includes N sheets of index paper. When N sheets of index paper are stacked, the tabs Tb of each index paper are lined up in one direction (tab arrangement direction). In other words, the tab positions of each index paper are shifted from each other in the tab arrangement direction. In such an index paper set, the number of tabs of the index paper set including the index paper can be determined on the basis of the value obtained by dividing the width in the tab arrangement direction of a certain index paper by the width in the tab arrangement direction of the tab Tb of the index paper.

Accordingly, the controller 5 selects the larger value of the main scanning division value and the sub-scanning division value. Then, the controller 5 determines the number of tabs of the index paper set including the index paper as the target paper P, on the basis of the selected division value.

In the example illustrated in FIG. 5, the sub-scanning division value is selected. The sub-scanning division value is approximately 3 (the division value may be rounded to the first decimal place). As a result, the controller 5 determines that the number of tabs is 3.

2. Second Process

The controller 5 performs a process that counts a number of changes from white pixels to black pixels (or a number of changes from black pixels to white pixels) as a number of main scanning edges, from one side to the other side in a main scanning direction, targeting at a pixel located between the edge pixel located farthest to one side in the main scanning direction and the edge pixel located farthest to the other side in the main scanning direction, for each of a plurality of main scanning pixel lines in the read data. The controller 5 does not target at the main scanning one-side pixel and the main scanning other-side pixel for the main scanning count process.

For example, the controller 5 sets a plurality of main scanning pixel lines one by one as the count target of the main scanning count process. Then, the controller 5 checks the pixels one by one from one side to the other side in the main scanning direction of a main scanning pixel line to be counted. When a white pixel changes to a black pixel, the count value of the number of main scanning edges of the main scanning pixel line to be counted is incremented by one.

In addition, the controller 5 performs a process that counts a number of changes from white pixels to black pixels (or a number of changes from black pixels to white pixels) as a number of sub-scanning edges, from one side to the other side in a sub-scanning direction, targeting at a pixel located between the edge pixel located farthest to one side in the sub-scanning direction and the edge pixel located farthest to the other side in the sub-scanning direction, for each of a plurality of sub-scanning pixel lines in the read data. The controller 5 does not target at the sub-scanning one-side pixel and the sub-scanning other-side pixel for the sub-scanning count process.

For example, the controller 5 sets a plurality of sub-scanning pixel lines one by one as the count target of the sub-scanning count process. Then, the controller 5 checks the pixels one by one from one side to the other side in the sub-scanning direction of a sub-scanning pixel line to be counted. When a white pixel changes to a black pixel, the count value of the number of sub-scanning edges of the sub-scanning pixel line to be counted is incremented by one.

In addition, after the main scanning count process, the controller 5 selects a specific number of main scanning pixel lines (for example, the specific number is 16) in descending order of the number of main scanning edges, and obtains an average value of main scanning edges by averaging the number of main scanning edges of the selected specific number of main scanning pixel lines. Moreover, after the sub-scanning count process, the controller 5 selects a specific number of sub-scanning pixel lines (for example, the specific number is 16) in descending order of the number of sub-scanning edges, and obtains an average value of sub-scanning edges by averaging the number of sub-scanning edges of the selected specific number of sub-scanning pixel lines.

In the example illustrated in FIG. 6, the main scanning pixel line Xp passes through one punch hole area PA (the area corresponding to the punch hole Ph in the read data). Therefore, the number of main scanning edges of the main scanning pixel line Xp is 1. The number of main scanning edges of a main scanning pixel line that does not pass through the punch hole area PA is 0.

In the example illustrated in FIG. 6, the punch hole area PAs are not arranged in the main scanning direction. Therefore, in the example illustrated in FIG. 6, a main scanning pixel line (the main scanning pixel line Xp, etc.) that passes through one punch hole area PA is selected as the main scanning pixel line having a large number of main scanning edges. As a result, the average value of main scanning edges is approximately 1.

In addition, in the example illustrated in FIG. 6, the sub-scanning pixel line Yp passes through two punch hole areas PA. Therefore, the number of sub-scanning edges of the sub-scanning pixel line Yp is 2. The number of sub-scanning edges of a sub-scanning pixel line that does not pass through the punch hole area PA is 0.

In the example illustrated in FIG. 6, two punch hole areas PAs are arranged in the sub-scanning direction. Therefore, in the example illustrated in FIG. 6, a sub-scanning pixel line (the sub-scanning pixel line Yp, etc.) that passes through two punch hole areas PA is selected as the sub-scanning pixel line having a large number of sub-scanning edges. As a result, the average value of sub-scanning edges is approximately 2.

Here, when a punch paper is read, the same number of punch hole areas PA as the punch holes Ph formed in the punch paper to be read appear in the read data. Therefore, the average value of main scanning edges and the average value of sub-scanning edges are respectively 1 one or more.

Accordingly, when the average value of main scanning edges and the average value of sub-scanning edges are respectively one or more, the controller 5 determines that the type of the target paper P is a punch paper. When at least one of the average value of main scanning edges and the average value of sub-scanning edges is less than 1, the controller 5 does not determine that the type of the target paper P is a punch paper.

When determining that the target paper P is a punch paper, the controller 5 determines the number of punch holes formed in the target paper P (punch paper). Specifically, the controller 5 obtains a multiplication value of the average value of main scanning edges and the average value of sub-scanning edges.

Here, when a punch paper (punch paper having two punch holes Ph formed) such as that illustrated in FIG. 4 is read, the read data illustrated in FIG. 6 is obtained. In the type determination process (the process of obtaining the average value of the average value of main scanning edges of the average value of sub-scanning edges), in which the read data illustrated in FIG. 6 is targeted, the average value of main scanning edges is approximately 1 and the average value of sub-scanning edges is approximately 2. This is because the punch paper to be read has a row of holes including two punch holes Ph. If, although not illustrated, a punch paper (punch paper with a total of four punch holes) in which two rows of holes including two punch holes Ph are formed is read, the average value of the main scanning edge is approximately 2, and the average value of sub-scanning edges approximately 2.

Accordingly, the controller 5 determines the number of punch holes on the basis of the multiplication value of the average value of main scanning edges and the average value of sub-scanning edges (the multiplication value may be rounded to the first decimal place). When a punch paper in which one row of holes including two punch holes Ph is formed is read (when the read data illustrated in FIG. 6 is obtained), the number of punch holes is determined to be 2 (=1×2). When a punch paper in which two rows of holes including two punch holes Ph are formed is read, the number of punch holes is determined to be 4 (=2×2).

In addition, when determining that the target paper P is a punch paper, the controller 5 acquires information indicating the formation position (punch hole position) of an end side punch hole Ph which is the punch hole Ph located farthest to one side in the main scanning direction and located farthest to one side in the sub-scanning direction of the target paper P (punch paper). The details will be described below.

The controller 5 determines whether each of the plurality of main scanning pixel lines in the read data includes the edge pixel corresponding to an edge of a punch hole Ph formed in the target paper P. Then, the controller 5 recognizes a number of second main scanning pixels, which is a number of pixels from a main scanning one-side pixel (edge pixel) to the edge pixel that appears subsequently to the main scanning one-side pixel when scanning from one side to the other side in the main scanning direction, for each of the main scanning pixel lines including the edge pixel corresponding to an edge of a punch hole Ph.

In addition, the controller 5 determines whether each of the plurality of sub-scanning pixel lines in the read data includes the edge pixel corresponding to an edge of a punch hole Ph formed in the target paper P. Then, the controller 5 recognizes a number of second sub-scanning pixels, which is a number of pixels from a sub-scanning one-side pixel (edge pixel) to the edge pixel that appears subsequently to the sub-scanning one-side pixel when scanning from one side to the other side in the sub-scanning direction, for each of the sub-scanning pixel lines including the edge pixel corresponding to an edge of a punch hole Ph.

In the example illustrated in FIG. 6, focusing on the main scanning pixel line Xp, the pixel located at the intersection of the main scanning pixel line Xp and a sub-scanning pixel line Yed is recognized as the edge pixel that appears subsequently to the main scanning one-side pixel when scanning from one side to the other side in the main scanning direction.

Here, in the main scanning pixel line Xp illustrated in FIG. 6, the number of pixels from the pixel located farthest to one side in the main scanning direction (the pixel located on an end in one side in the main scanning direction of the read data) up to the pixel adjacent to the main scanning one-side pixel in one side in the main scanning direction is Nx3. In addition, the number of pixels from the pixel located farthest to one side in the main scanning direction (the pixel located on an end in one side in the main scanning direction of the read data) up to the pixel located at the intersection of the main scanning pixel line Xp and the sub-scanning pixel line Yed is Nx5. In this case, the number of second main scanning pixels of the main scanning pixel line Xp illustrated in FIG. 6 is the number of pixels obtained by subtracting Nx3 from Nx5.

In the example illustrated in FIG. 6, a main scanning pixel line that does not pass through the punch hole area PA does not include the edge pixel corresponding to the edge of the punch hole Ph formed in the target paper P. That is, for the main scanning pixel line that does not pass through the punch hole area PA, the process of obtaining the number of second main scanning pixels is not performed.

In the example illustrated in FIG. 6, focusing on the sub-scanning pixel line Yp, the pixel located at the intersection of the sub-scanning pixel line Yp and a main scanning pixel line Xed is recognized as the edge pixel that appears subsequently to the sub-scanning one-side pixel when scanning from one side to the other side in the sub-scanning direction.

Here, in the sub-scanning pixel line Yp illustrated in FIG. 6, the number of pixels from the pixel located farthest to one side in the sub-scanning direction (the pixel located on an end in one side in the sub-scanning direction of the read data) up to the pixel adjacent to the sub-scanning one-side pixel in one side in the sub-scanning direction is Ny3. In addition, the number of pixels from the pixel located farthest to one side in the sub-scanning direction (the pixel located on an end in one side in the sub-scanning direction of the read data) up to the pixel located at the intersection of the sub-scanning pixel line Yp and the main scanning pixel line Xed is Ny5. In this case, the number of second sub-scanning pixels of the sub-scanning pixel line Yp illustrated in FIG. 6 is the number of pixels obtained by subtracting Ny3 from Ny5.

In the example illustrated in FIG. 6, a sub-scanning pixel line that does not pass through the punch hole area PA does not include the edge pixel corresponding to the edge of the first punch hole Ph formed in the target paper P. That is, for the sub-scanning pixel line that does not pass through the punch hole area PA, the process of obtaining the number of second sub-scanning pixels is not performed.

After recognizing the number of second main scanning pixels, the controller 5 selects a specific number of main scanning pixel lines (for example, the specific number is 16) in descending order of the number of second main scanning pixels, and obtains an average value of the numbers of second main scanning pixels of the selected specific number of main scanning pixel lines. In addition, after recognizing the number of second sub-scanning pixels, the controller 5 selects a specific number of sub-scanning pixel lines (for example, the specific number is 16) in descending order of the number of second sub-scanning pixels, and obtains an average value of the numbers of second sub-scanning pixels of the selected specific number of sub-scanning pixel lines. The controller 5 recognizes the position advanced from one side to the other side in the main scanning direction from an end in one side in the main scanning direction of the target paper P by the width corresponding to the average value of the numbers of second main scanning pixels, as the formation position of the end side punch hole Ph in the main scanning direction. In addition, the controller 5 recognizes the position advanced from one side to the other side in the sub-scanning direction from an end in one side in the sub-scanning direction of the target paper P by the width corresponding to the average value of the numbers of second sub-scanning pixels, as the formation position of the end side punch hole Ph in the sub-scanning direction.

Update of History Information (Paper Information)

The storage unit 7 stores history information indicating the usage history of the paper P used for printing by the printer 3 for each type of the paper P. The history information includes information indicating the cumulative number of sheets used (the number of sheets used for printing) of a corresponding paper P. In addition, the history information includes the read data of the corresponding paper P. Moreover, the history information includes information indicating the last print date (last update date) of printing using the corresponding paper P.

In addition, the history information is associated with the paper information indicating the type of the corresponding paper P. The history information is non-volatilely stored in the storage unit 7 together with corresponding paper information. If there are multiple types of paper P used in past printing, multiple pieces of history information corresponding respectively to the multiple types of paper P are stored in the storage unit 7.

The controller 5 performs a history management process for managing the history information. The history management process includes a process of updating existing history information and a process of adding new history information. The controller 5 performs a history management process every time a print job is performed.

Figure 7:
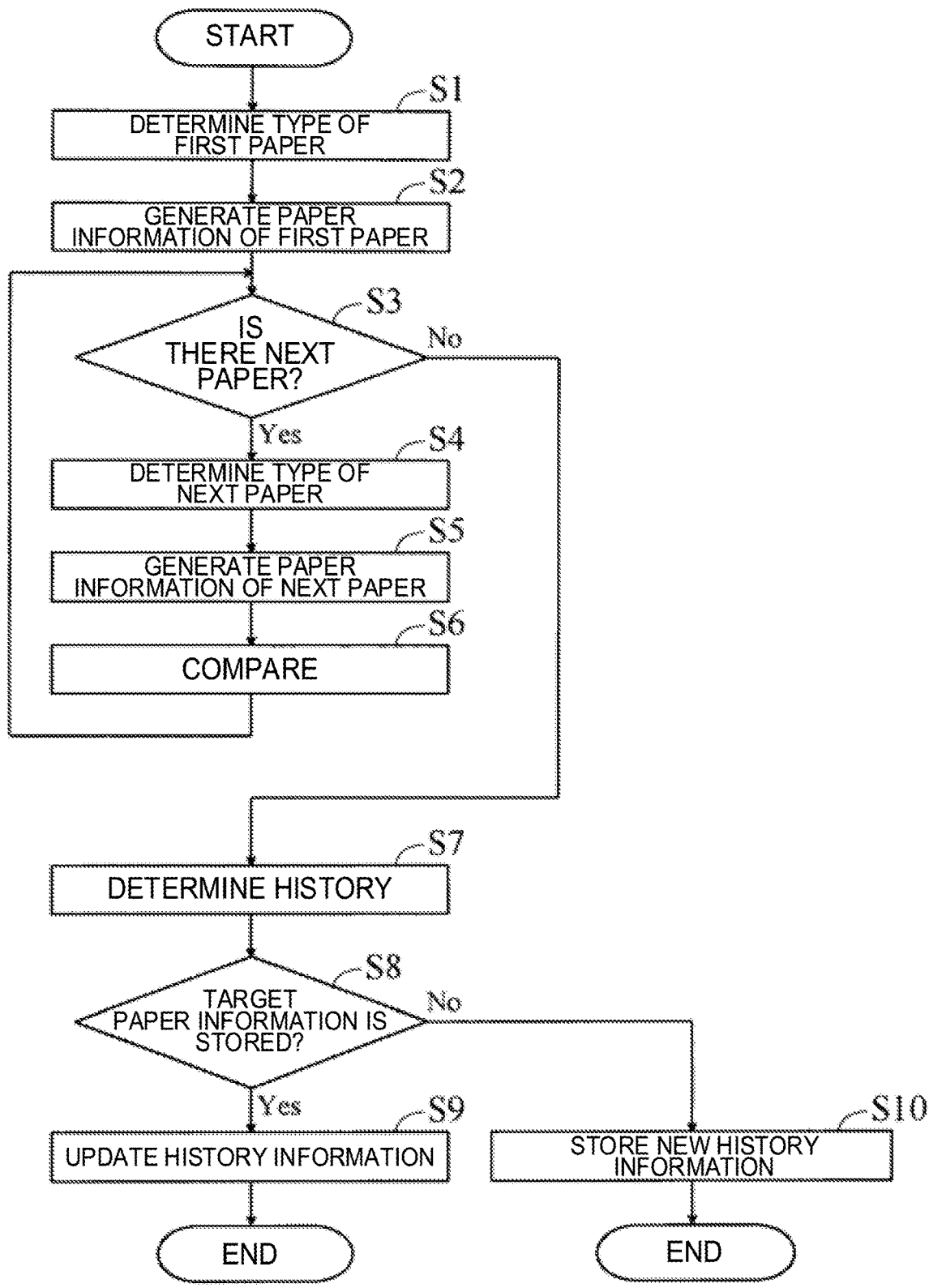
FIG. 7 is a flowchart illustrating the flow of a history management process performed by the controller of the image forming apparatus of the present embodiment.

The flow of the history management process performed by the controller 5 will be described below with reference to the flowchart illustrated in FIG. 7. After a print job is started, the reader 4 reads the first sheet of paper P, and when the controller 5 acquires the read data obtained by the reading, the flow illustrated in FIG. 7 starts.

In step S1, the controller 5 sets the first sheet of paper P as a target. Then, the controller 5 determines the type of the target paper P by performing the type determination process on the basis of the read data of the target paper P (the first sheet of paper P). The controller 5 determines which of the four types of a plain paper, an index paper, a punch paper, and a tabbed punch paper the type of the target paper P is.

When the type determined by the type determination process is an index paper, the controller 5 determines the number of tabs of the index paper set including the target paper P (index paper).

When the type determined by the type determination process is a punch paper, the controller 5 determines the number of punch holes formed in the target paper P (punch paper). The controller 5 determines a punch hole position formed in the target paper P. The controller 5 determines the formation position of an end side punch hole Ph as the punch hole position of the target paper P.

In the type determination process by the controller 5, both the condition that the type of the target paper P should be determined to be an index paper and the condition that the target paper P should be determined to be a punch paper may be fulfilled. In such case, the controller 5 determines that the target paper P is a tabbed punch paper. When the target paper P is a tabbed punch paper, the controller 5 determines the number of tabs of the index paper set including the target paper P (tabbed punch paper), the number of punch holes in the target paper P, and the punch hole position of the target paper P.

In addition, the controller 5 determines the size (the width in the main scanning direction and the width in the sub-scanning direction) of the target paper P. The controller 5 determines the size of the target paper P regardless of whether the paper is a plain paper, an index paper, a punch paper, or a tabbed punch paper.

In step S2, the controller 5 generates paper information indicating the type of the target paper P (the first sheet of paper P). When the target paper P is a plain paper, the controller 5 generates paper information indicating that the type of the target paper P is a plain paper. When the target paper P is an index paper, the controller 5 generates paper information indicating that the type of the target paper P is an index paper. When the target paper P is a punch paper, the controller 5 generates paper information indicating that the type of the target paper P is a punch paper. When the target paper P is a tabbed punch paper, the controller 5 generates paper information indicating that the type of the target paper P is a tabbed punch paper.

In addition, when the target paper P is an index paper, the controller 5 includes, in the paper information, information indicating the number of tabs of the index paper set including the target paper P. When the target paper P is a punch paper, the controller 5 includes, in the paper information, information indicating the number of punch holes of the target paper P and information indicating the punch hole positions of the target paper P. When the target paper P is a tabbed punch paper, the controller 5 includes, in the paper information, information indicating the number of tabs of the index paper set including the target paper P, information indicating the number of punch holes of the target paper P, and information indicating the punch hole positions of the target paper P.

Here, the controller 5 performs the type determination process on the memory 52 (RAM). Then, the controller 5 holds in the memory 52 the paper information generated on the basis of the determination result of the type determination process.

In step 3, the controller 5 determines whether there is a next paper P (next paper P) on which an image should be printed. If the controller 5 determines that there is a next paper P, the processing proceeds to step S4.

When the processing proceeds to step S4, the controller 5 performs the type determination process for the next paper P. In addition, in step S5, the controller 5 generates paper information of the next paper P on the basis of the determination result of the type determination process for the next paper P.

In step S6, the controller 5 performs a comparison process. In doing so, the controller 5 compares existing paper information on the memory 52 with new paper information generated this time. After that, the processing proceeds to step S3.

Here, the comparison process will be described. When the paper information indicating the paper P of the same type as the paper P indicated by the new paper information is already held in the memory 52, the controller 5 increments by one the number of sheets printed this time associated with the paper information indicating the paper P of the same type as the paper P indicated by the new paper information. In this case, the controller 5 does not hold the new paper information in the memory 52. On the other hand, when the paper information indicating the paper P of the same type as the paper P indicated by the new paper information is not held in the memory 52, the controller 5 associates the number of sheets printed this time with the new paper information and holds the new paper information in the memory 52. The number of sheets printed this time is the number of sheets used in the print job of this time of the paper P indicated by corresponding paper information.

The paper information of the first sheet of paper P is always held in the memory 52. The initial value of the number of printed sheets this time corresponding to the paper information of the first sheet of paper P is 1.

Then, if the first sheet of paper P and the second sheet of paper P (next sheet P) are of the same type, the number of printed sheets this time corresponding to the paper information of the first sheet of paper P is incremented by one. (the value of the number of sheets printed this time is 2). In this case, the paper information of the second sheet of paper P is not held.

If the first sheet of paper P and the second sheet of paper P (next paper P) are of different types, the paper information of the second sheet of paper P is held. The paper information of the second sheet of paper P is associated with the number of sheets printed this time. The initial value of the number of printed sheets this time corresponding to the paper information of the second sheet of paper P is 1. In this case, the number of printed sheets this time corresponding to the paper information of the first sheet of paper P is not incremented.

If the number of printed sheets in a print job is three or more, the paper information of the third and subsequent sheets of paper P is also compared with existing paper information. Then, the number of printed sheets this time corresponding to the existing paper information is incremented. Alternatively, the paper information of the third and subsequent sheets of paper P is held in the memory 52.

In step S3, if the controller 5 determines that there is no next paper P, the processing proceeds to step S7. If there is no next paper P, the print job of this time is completed when the paper P currently being conveyed is ejected.

After the processing proceeds to step S7, the controller 5 compares the new paper information currently held in the memory 52 with the existing paper information corresponding to the history information stored in the storage unit 7, and performs a history determination process that determines whether there is a usage history of the same type of paper P as the paper P indicated by the new paper information (whether the paper P has been used in a past print job). In other words, the controller 5 performs a process of determining whether the target paper information which is the paper information indicating the same type of paper P as the paper P indicated by the new paper information is already stored in the storage unit 7. When there are multiple pieces of new paper information currently held in the memory 52, the controller 5 performs the history determination process for each of the multiple pieces of new paper information.

For example, supposing that the paper P indicated by the new paper information is an index paper and the number of tabs is three. In this case, the controller 5 searches the storage unit 7 for the paper information corresponding to an index paper having three tabs. Then, if the paper information is stored in the storage unit 7, the controller 5 recognizes the paper information as the target paper information (paper information to be updated). In this example, supposing that even if the paper information corresponding to an index paper is stored in the storage unit 7, if the number of tabs indicated by the paper information is two or four or more, the paper information is not recognized as the target paper information.

In addition, for example, supposing that the paper P indicated by the new paper information is a punch paper and the number of punch holes is two. In this case, the controller 5 searches the storage unit 7 for the paper information corresponding to a punch paper with two punch holes and including information indicating a punch hole position whose deviation amount from the punch hole position indicated by the new paper information is less than a specific amount. Then, if the paper information is stored in the storage unit 7, the controller 5 recognizes the paper information as the target paper information. In this example, supposing that even if the paper information corresponding to a punch paper is stored in the storage unit 7, if the number of punch holes indicated in the paper information is less than two, or three or more, and if information indicating the punch hole position whose deviation amount from the punch hole position indicated by the new paper information is equal to or more than a specific amount is included in the paper information, the paper information is not recognized as the target paper information.

In step S8, the controller 5 determines whether the target paper information is stored in the storage unit 7. If the controller 5 determines that the target paper information is stored in the storage unit 7, the processing proceeds to step S9.

After the processing proceeds to step S9, the controller 5 updates each information included in the existing history information corresponding to the target paper information. That is, the controller 5 updates the information indicating the cumulative number of sheets used and the information indicating the last print date (last update date). The read data included in the history information is not updated.

For example, supposing that the cumulative number of sheets used of the history information corresponding to the target paper information is 450, and the number of printed sheets this time of the new paper information is 50. In this case, the controller 5 updates the cumulative number of sheets used of the history information corresponding to the target paper information to 500 (=450+50).

In addition, supposing that the last print date of the history information corresponding to the target paper information is May 5, 2019, and the execution date of the print job of this time is Jun. 10, 2019. In this case, the controller 5 updates the last print date of the history information corresponding to the target paper information to Jun. 10, 2019.

In step S8, if the controller 5 determines that the target paper information is not stored in the storage unit 7, the processing proceeds to the step S10. When the processing proceeds to step S10, the controller 5 stores, in the storage unit 7, the new paper information and the new history information indicating the usage history of the paper P indicated by the new paper information in association with each other.

The new history information includes information indicating the cumulative number of sheets used of the paper P indicated by corresponding new paper information. That is, the number of printed sheets this time associated with the new paper information is the cumulative number of sheets used of the new history information. In addition, the new history information includes the read data of the paper P indicated by the new paper information. Moreover, the new history information includes the information indicating the execution date of the print job of this time as the information indicating the last print date (last update date).

Acceptance of Search Operation

Figure 8:
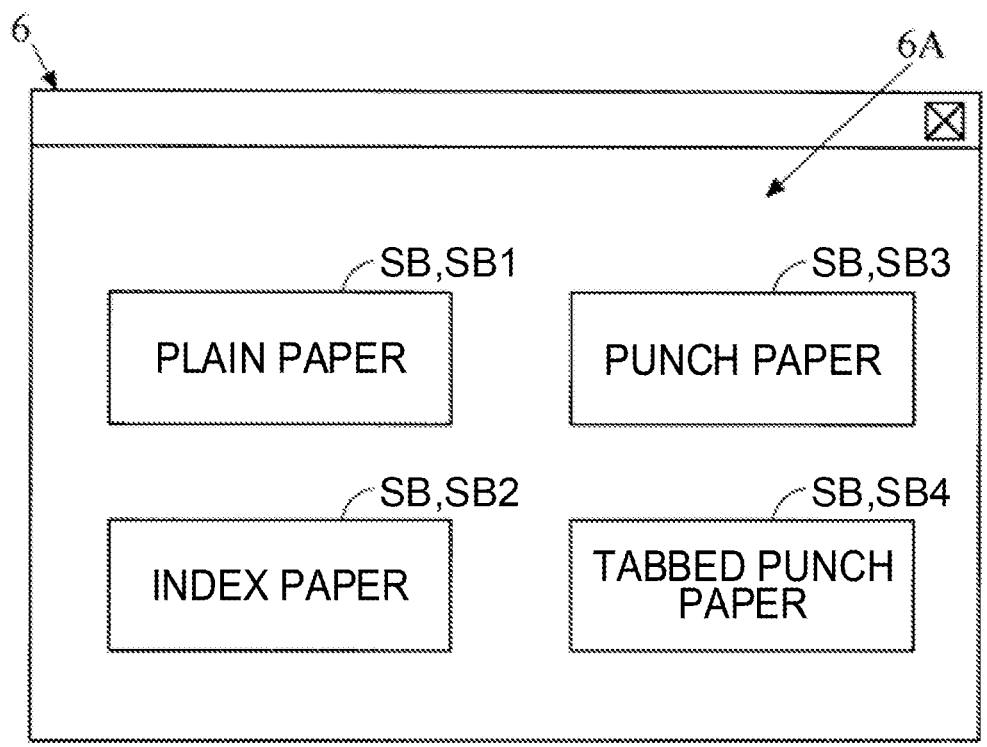
FIG. 8 is a diagram illustrating a selection screen displayed by an operation panel of the image forming apparatus of the present embodiment.

The operation panel 6 accepts a search operation of inputting the type of paper P from the user. When accepting the search operation, the operation panel 6 first displays a selection screen 6A such as that illustrated in FIG. 8.

Four selection buttons SB (SB1, SB2, SB3, and SB4) are arranged in the selection screen 6A. The selection button SB1 corresponds to a plain paper. The selection button SB2 corresponds to an index paper. The selection button SB3 corresponds to a punch paper. The selection button SB4 corresponds to a tabbed punch paper.

Figure 9:
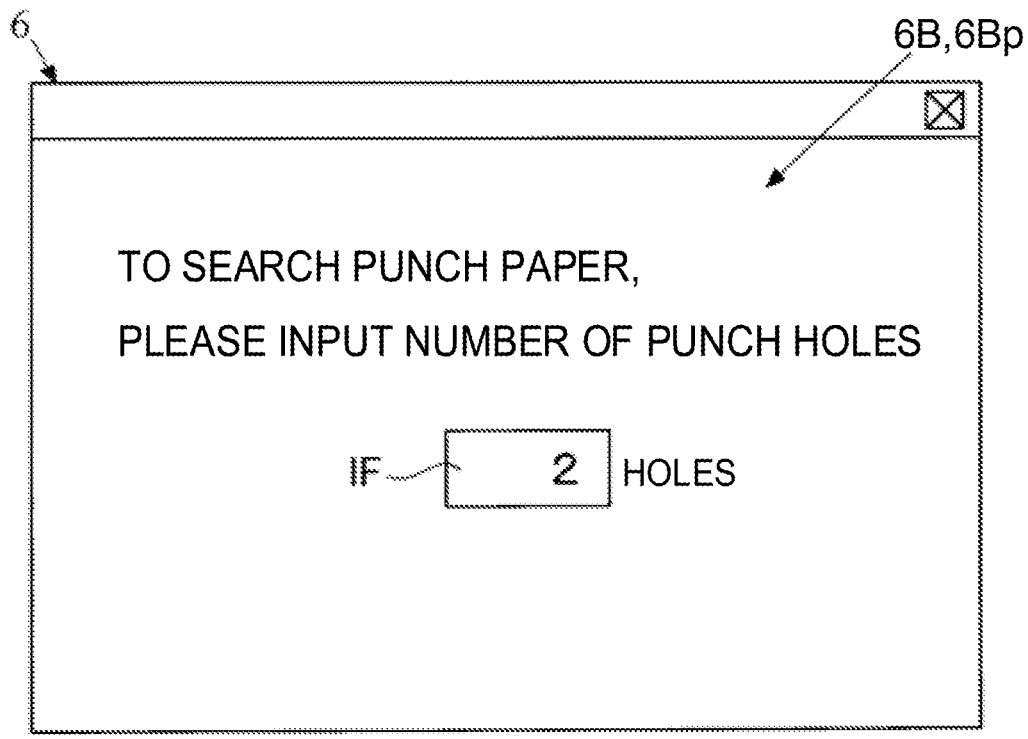
FIG. 9 is a diagram illustrating a detail search screen displayed by the operation panel of the image forming apparatus of the present embodiment.

While displaying the selection screen 6A, the operation panel 6 accepts a touch operation for any of the selection button SBs as one of the search operations. When detecting a search operation on the selection screen 6A, the controller 5 causes the operation panel 6 to display a detail search screen 6B. An example of the detail search screen 6B is illustrated in FIG. 9. The detail search screen 6B illustrated in FIG. 9 corresponds to a punch paper. Hereinafter, the detail search screen 6B corresponding to a punch paper is assigned a sign 6Bp.

The detail search screen 6Bp corresponding to a punch paper is displayed when the selection button SB3 corresponding to the punch paper is touched. Although not illustrated, when the selection button SB1 corresponding to a plain paper is touched, the detail search screen 6B corresponding to the plain paper is displayed. When the selection button SB2 corresponding to an index paper is touched, the detail search screen 6B corresponding to the index paper is displayed. When the selection button SB4 corresponding to a tabbed punch paper is touched, the detail search screen 6B corresponding to the tabbed punch paper is displayed.

A hole number input field IF for inputting the number of punch holes is arranged in the detail search screen 6Bp of the punch paper. The operation panel 6 accepts the operation of inputting the number of punch holes in the hole number input field IF as one of the search operations. Although not illustrated, a size input field for inputting a paper size may be arranged on the detail search screen 6Bp of the punch paper. In this case, the operation panel 6 also accepts the operation of inputting a paper size in the size input field as one of the search operations.

Although not illustrated, a tab number input field for inputting the number of tabs is arranged in the detail search screen 6B of the index paper. In addition, the operation panel 6 accepts the operation of inputting the number of tabs in the tab number input field as one of the search operations. As is the case with the detail search screen 6Bp of the punch paper, a size input field may be arranged in the detail search screen 6B of the index paper.

In addition, although not illustrated, a hole number input field for inputting the number of punch holes and a tab number input field for inputting the number of tabs is arranged in the detail search screen 6B of a tabbed punch paper. In addition, the operation panel 6 accepts the operation of inputting the number of punch holes in the hole number input field and the operation of inputting the number of tabs in the tab number input field as one of the search operations. As is the case with the detail search screen 6Bp of the punch paper, a size input field may be arranged in the detail search screen 6B of the tabbed punch paper.

In addition, although not illustrated, a size input field for inputting a paper size is arranged in the detail search screen 6B of a plain paper. The operation panel 6 accepts the operation of inputting a paper size in the size input field as one of the search operations.

When detecting a search operation on the detail search screen 6B, the controller 5 performs a search process of searching the storage unit 7 for the paper information indicating the type of paper P input in the search operation. For example, when "2" is entered in the hole number input field IF of the detail search screen 6Bp of the punch paper, the controller 5 searches the storage unit 7 for the paper information corresponding to a punch paper having two punch holes.

In addition, for example, when "3" is input in the tab number input field of the detail search screen 6B of the index paper, the controller 5 searches the storage unit 7 for the paper information corresponding to the index paper of an index paper set having three tabs.

Moreover, when a paper size is entered in the size input field of the detail search screen 6B, the controller 5 searches only the paper information corresponding to the paper P of the entered size. That is, when "2" is input in the hole number input field IF of the detail search screen 6Bp of the punch paper and "A4" is input in the size input field, the controller 5 searches the storage unit 7 for the paper information corresponding to a punch paper having the paper size of A4 and two punch holes.

Figure 10:
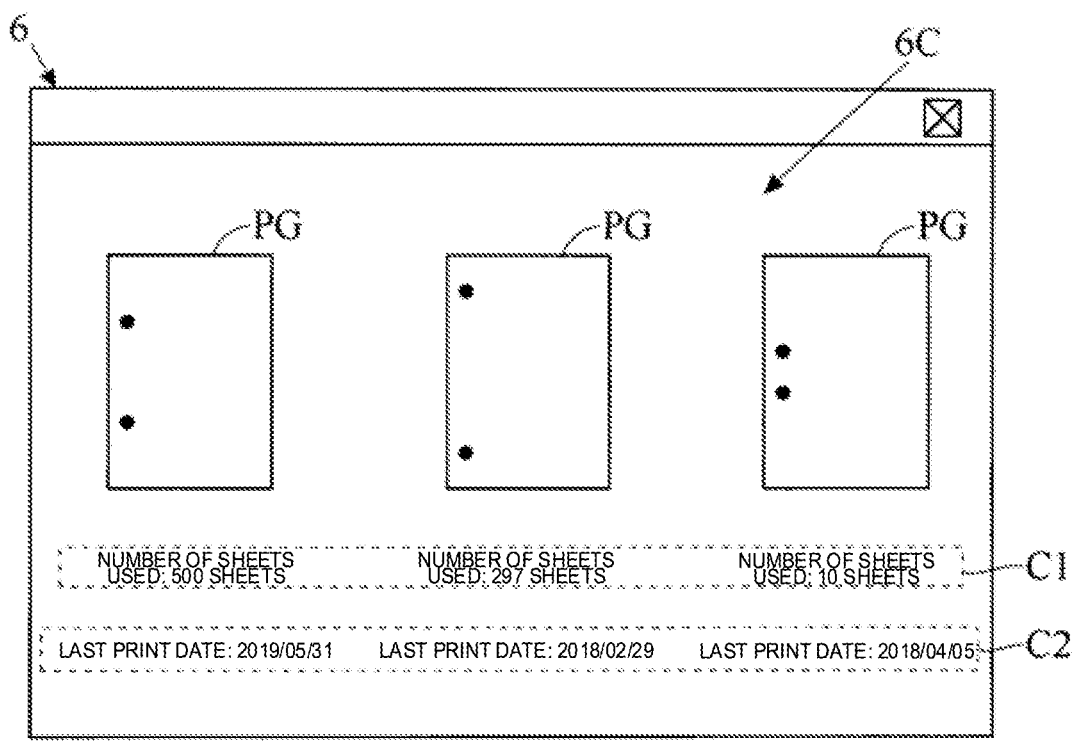
FIG. 10 is a diagram illustrating a search result screen displayed by the operation panel of the image forming apparatus of the present embodiment.

When paper information indicating the type of paper P entered in the search operation is found, the controller 5 causes the operation panel 6 to display the history information corresponding to the paper information found in the search process. In doing so, the operation panel 6 displays a search result screen 6C such as that illustrated in FIG. 10. The search result screen 6C illustrated in FIG. 10 is an example, and the screen layout and the like can be modified arbitrarily. In the following description, the history information corresponding to the paper information found in the search process is referred to as target history information.

The operation panel 6 displays the cumulative number of sheets used of the paper P indicated by the paper information corresponding to the target history information, on the search result screen 6C. In FIG. 10, the information displayed in an area C1 surrounded by the broken line corresponds to the cumulative number of sheets used.

In addition, the operation panel 6 displays the last print date of printing using the paper P indicated by the paper information corresponding to the target history information, on the search result screen 6C. In FIG. 10, the information displayed in an area C2 surrounded by the broken line corresponds to the last print date.

In addition, the controller 5 generates image data for display on the basis of the read data of the paper P indicated by the paper information corresponding to the target history information. Then, the controller 5 causes the operation panel 6 to perform the display based on the image data for display. That is, the operation panel 6 displays a paper image PG based on the read data of the paper P indicated by the paper information corresponding to the target history information, on the search result screen 6C.

Here, when multiple pieces of paper information are found in the search process (when there are multiple pieces of the target history information), the controller 5 causes the operation panel 6 to display multiple pieces of target history information in order from the target history information having a largest cumulative number of sheets used of the paper P indicated by the corresponding paper information. FIG. 10 illustrates the search result screen 6C in which the target history information is displayed in order from the target history information having a largest cumulative number of sheets used of the paper P indicated by the corresponding paper information.

For example, when a preliminarily specified scroll operation is performed on the operation panel 6 in the state illustrated in FIG. 10, the controller 5 causes the operation panel 6 to display the target history information having a smaller number of cumulative number of sheets used of the paper P indicated by the corresponding paper information than the number of cumulative number of sheets used of the target history information currently being displayed. In this case as well, the target history information is displayed in order from the target history information having a largest cumulative number of sheets used of the paper P indicated by the corresponding paper information.

In addition, the operation panel 6 accepts the operation of inputting a period as a search operation. When the operation panel 6 accepts the operation of inputting a period, the controller 5 sets the period input in the search operation as a search target period. Then, the controller 5 causes the operation panel 6 to display the history information in which the last print date of printing using the paper P indicated by the corresponding paper information is included in the search target period. In this case as well, the target history information is displayed in order from the target history information having a largest cumulative number of sheets used of the paper P indicated by the corresponding paper information.

In the configuration of the present embodiment, as described above, the controller 5 determines the type of the paper P used for printing on the basis of the read data obtained by reading the paper P by the reader 4. When the reader 4 reads an index paper, a tab area TA (area that does not appear in the read data of a plain paper) appears in the read data. When the reader 4 reads a punch paper, a punch hole area PA (area that does not appear in the read data of a plain paper) appears in the read data.

As a result, in the configuration in which the type of the paper P is determined on the basis of the read data, it is possible to easily determine which of a plain paper, an index paper, a punch paper, and a tabbed punch paper has been used for printing. That is, the number of sheets used of a punch paper, an index paper, and the like can be counted separately from a plain paper. For example, even if a plain paper and a punch paper are mixed in a paper cassette CA, when the plain paper is fed, the number of sheets used of the plain paper is incremented. When the punch paper is fed, the number of sheets used of the punch paper is incremented, and the number of sheets used of the plain paper is not incremented.

In addition, in the configuration of the present embodiment, a search operation is accepted. When a search of an index paper is instructed by a search operation, the number of index papers used is displayed. When a search of a punch paper is instructed by a search operation, the number of punched papers used is displayed. From the user's point of view, it is possible to distinguish and grasp the number of sheets used for the plain paper, index paper, punch paper, and tabbed punch paper, and thus the configuration is convenient for the user. In this embodiment, the last print date of printing using the paper P found by the search is also displayed. This improves the convenience for the user who wants to know the last print date.

Here, the controller 5 performs a first process and a second process as a type determination process for determining the type of the paper P. The first process is a process of detecting a tab Tb formed on the paper P. The second process is a process of detecting a punch hole Ph formed in the paper P. By performing such a type determination process, it is possible to easily determine which paper P: a plain paper, an index paper, a punch paper, and a tabbed punch paper has been read by the reader 4 (which paper P has been used for printing).

Moreover, when the paper P read by the reader 4 is an index paper, the number of tabs can be determined. When the paper P read by the reader 4 is a punch paper, the number of punch holes can be determined. That is, the type of an index paper can be determined in detail, and the type of a punch paper can be determined in detail.

Accordingly, the operation panel 6 accepts the operation of inputting the number of tabs as a search operation. When the number of tabs is input, the number of sheets used of the index paper corresponding to the input number of tabs can be grasped among the index papers used in the past. This will further improve the convenience for the user.

In addition, the operation panel 6 accepts the operation of inputting the number of punch holes as a search operation. When the number of punch holes is input, the number of sheets used of the punch paper corresponding to the input number of punch holes can be grasped among the punch papers used in the past. This will further improve the convenience for the user.

Here, in the configuration in which the type of the paper P is determined on the basis of the read data, if the paper P being conveyed is skewed or the paper P being conveyed is folded, the type of the paper P is determined to be different from the type of an other paper P. That is, the history information corresponding to the skewed paper P and the folded paper P is separately generated and stored. From the user's point of view, the history information of the skewed paper P and the folded paper P is not necessary.

Accordingly, when multiple pieces of paper information are found in the search process, the controller 5 causes the operation panel 6 to display multiple pieces of the history information corresponding respectively to the multiple pieces of the paper information found in the search process in order from the history information having a largest cumulative number of sheets used of the paper P indicated by the corresponding paper information. As a result, the history information of the paper P that is a frequently used type is displayed preferentially. That is, the history information of a skewed paper P and a folded paper P is not displayed precedently.

As a variation, the display order may be determined on the basis of the last print date. In the variation, when multiple pieces of paper information are found in the search process, the controller 5 causes the operation panel 6 to display multiple pieces of the history information corresponding respectively to the multiple pieces of the paper information found in the search process in order from the history information having a latest last print date of printing using the paper P indicated by the corresponding paper information.

In addition, in the present embodiment, the operation panel 6 accepts an operation of inputting a paper size as a search operation. Moreover, the operation panel 6 accepts an operation of inputting a period as a search operation. In this configuration, a search condition can be narrowed down in detail, and thus the convenience for the user will be further improved.

Moreover, when the controller 5 displays the history information on the operation panel 6, the paper image PG based on the read data of a corresponding paper P is further displayed. In this configuration, it will be easy for a user to image the shape of the paper P found by the search, and thus the configuration is convenient for the user.

It should be considered that the embodiment disclosed this time is exemplary in all respects and is not restrictive. The scope of the present disclosure is indicated by the claims rather than the description of the above embodiment. Furthermore, all modifications within the meaning and scope of the claims are included.

What is claimed is:

1. An image forming apparatus comprising:
    an operation panel;
    a printer that performs printing on a paper;
    a reader that reads a paper used for printing;
    a controller that, when the reader reads a paper, determines a type of paper read by the reader on a basis of read data obtained by reading the paper by the reader, and generates paper information indicating the type of paper read by the reader; and
    a storage unit that stores the paper information in association with history information indicating a usage history of a paper indicated by the paper information,
    wherein the controller determines whether target paper information which is paper information indicating a same type of paper as the paper indicated by newly generated the paper information is stored in the storage unit, and updates the history information corresponding to the target paper information when the target paper information is stored, and when the target paper information is not stored, causes the storage unit to store newly generated the paper information in association with new the history information indicating the usage history of the paper indicated by newly generated the paper information,
    wherein the operation panel accepts a search operation for inputting a type of paper from the user,
    wherein the controller performs a search process of searching the storage unit for the paper information indicating the type of paper input in the search operation, and causes the operation panel to display the history information corresponding to the paper information found in the search process, and
    wherein when generating the paper information, the controller:
        binarizes the read data;
        detects from the read data an edge pixel which is a pixel corresponding to an edge of a paper;
        recognizes a main scanning one-side pixel which is the edge pixel located farthest to one side in a main scanning direction and a main scanning other-side pixel which is the edge pixel located farthest to an other side in the main scanning direction, and recognizes a number of first main scanning pixels, which is a number of pixels from the main scanning one-side pixel to the main scanning other-side pixel, for each of a plurality of main scanning pixel lines extending in the main scanning direction in the read data;
        recognizes a sub-scanning one-side pixel which is the edge pixel located farthest to one side in a sub-scanning direction and a sub-scanning other-side pixel which is the edge pixel located farthest to an other side in the sub-scanning direction, for each of a plurality of sub-scanning pixel lines extending in the sub-scanning direction in the read data, and recognizes a number of first sub-scanning pixels, which is a number of pixels from the sub-scanning one-side pixel to the sub-scanning other-side pixel;
        obtains a main scanning greater-number-side average value by averaging numbers of first main scanning pixels of a specific number of the main scanning pixel lines in descending order of the numbers of first main scanning pixels, and obtains a main scanning lesser-number-side average value by averaging the numbers of first main scanning pixels of the specific number of the main scanning pixel lines in ascending order of the number of first main scanning pixels;
        obtains a sub-scanning greater-number-side average value by averaging numbers of first sub-scanning pixels of the specific number of the sub-scanning pixel lines in descending order of the number of first sub-scanning pixels, and obtains a sub-scanning lesser-number-side average value by averaging the numbers of first sub-scanning pixels of the specific number of the sub-scanning pixel lines in ascending order of the number of first sub-scanning pixels;

determines that the paper read by the reader is an index paper when a value obtained by subtracting the main scanning lesser-number-side average value from the main scanning greater-number-side average value and a value obtained by subtracting the sub-scanning lesser-number-side average value from the sub-scanning greater-number-side average value are respectively larger than preliminarily specified threshold values; and generates, as the paper information, information indicating that the paper read by the reader is an index paper.

2. The image forming apparatus according to claim 1, wherein when determining that the paper read by the reader is an index paper, the controller:

determines a number of tabs of an index paper set including the index paper read by the reader, on the basis of a larger value of a value obtained by dividing the main scanning greater-number-side average value by the main scanning lesser-number-side average value and a value obtained by dividing the sub-scanning greater-number-side average value by the sub-scanning lesser-number-side average value; and includes information indicating the determined number of tabs in the paper information.

3. The image forming apparatus according to claim 2, wherein the operation panel accepts an operation of inputting a number of tabs as the search operation, and wherein when a number of tabs is input in the search operation, the controller causes the operation panel to display the history information corresponding to the paper information including information indicating the number of tabs input in the search operation.

4. The image forming apparatus according to claim 1, wherein the history information includes a cumulative number of sheets used of a paper indicated by corresponding paper information, and wherein when causing the operation panel to display any of the history information, the controller causes to display the cumulative number of sheets used of the paper indicated by the paper information corresponding to the history information to be displayed.

5. The image forming apparatus according to claim 4, wherein when multiple pieces of the paper information are found in the search process, the controller causes the operation panel to display multiple pieces of the history information corresponding respectively to the multiple pieces of the paper information found in the search process in order from the history information having a largest cumulative number of sheets used of the paper indicated by the corresponding paper information.

6. The image forming apparatus according to claim 1, wherein the history information includes information indicating a last print date of printing using a paper indicated by corresponding paper information, and wherein when causing the operation panel to display any of the history information, the controller causes to display the last print date of printing using the paper indicated by the paper information corresponding to the history information to be displayed.

7. The image forming apparatus according to claim 6, wherein when multiple pieces of the paper information are found in the search process, the controller causes the operation panel to display multiple pieces of the history information corresponding respectively to the multiple pieces of the paper information found in the search process in order from the history information having a latest last print date of printing using the paper indicated by the corresponding paper information.

8. The image forming apparatus according to claim 1, wherein the controller determines a size of the paper read by the reader on a basis of the read data, and includes information indicating the determined paper size in the paper information, wherein the operation panel accepts an operation of inputting a paper size as the search operation, and wherein when a paper size is input in the search operation, the controller causes the operation panel to display the history information corresponding to the paper information including the information indicating the paper size input in the search operation.

9. The image forming apparatus according to claim 1, wherein the operation panel accepts an operation of inputting a period as the search operation, and wherein the controller sets the period input in the search operation as a search target period, and causes the operation panel to display the history information in which the last print date of printing using the paper indicated by corresponding paper information is included in the search target period.

10. The image forming apparatus according to claim 1, wherein the history information includes the read data obtained by reading a paper indicated by corresponding paper information, and wherein when causing the operation panel to display any of the history information, the controller causes to display a paper image based on the read data of the paper indicated by the paper information corresponding to the history information to be displayed.

11. An image forming apparatus comprising:
an operation panel;
a printer that performs printing on a paper;
a reader that reads a paper used for printing;
a controller that, when the reader reads a paper, determines a type of paper read by the reader on a basis of read data obtained by reading the paper by the reader, and generates paper information indicating the type of paper read by the reader; and
a storage unit that stores the paper information in association with history information indicating a usage history of a paper indicated by the paper information, wherein the controller determines whether target paper information which is paper information indicating a same type of paper as the paper indicated by newly generated the paper information is stored in the storage unit, and updates the history information corresponding to the target paper information when the target paper information is stored, and when the target paper information is not stored, causes the storage unit to store newly generated the paper information in association with new the history information indicating the usage history of the paper indicated by newly generated the paper information, wherein the operation panel accepts a search operation for inputting a type of paper from the user, wherein the controller performs a search process of searching the storage unit for the paper information indicating the type of paper input in the search operation, and causes the operation panel to display the history information corresponding to the paper information found in the search process, and wherein when generating the paper information, the controller:

binarizes the read data;

detects from the read data an edge pixel which is a pixel corresponding to an edge of a paper;

performs a process that counts a number of changes from white pixels to black pixels or a number of changes from black pixels to white pixels as a number of main scanning edges, from one side to the other side in a main scanning direction, targeting at a pixel located between the edge pixel located farthest to one side in the main scanning direction and the edge pixel located farthest to the other side in the main scanning direction, for each of a plurality of main scanning pixel lines extending in the main scanning direction in the read data;

performs a process that counts a number of changes from white pixels to black pixels or a number of changes from black pixels to white pixels as a number of sub-scanning edges, from one side to the other side in a sub-scanning direction, targeting at a pixel located between the edge pixel located farthest to one side in the sub-scanning direction and the edge pixel located farthest to the other side in the sub-scanning direction, for each of a plurality of sub-scanning pixel lines extending in the sub-scanning direction in the read data;

obtains an average value of main scanning edges by averaging the number of main scanning edges of a specific number of the main scanning pixel lines in descending order of the number of main scanning edges, and obtains an average value of sub-scanning edges by averaging the number of sub-scanning edges of the specific number of the sub-scanning pixel lines in descending order of the number of sub-scanning edges;

determines that the paper read by the reader is a punch paper when the average value of main scanning edges and the average value of sub-scanning edges are each one or more; and generates, as the paper information, information indicating that the paper read by the reader is a punch paper.

12. The image forming apparatus according to claim 11, wherein when determining that the paper read by the reader is a punch paper, the controller:

determines whether each of the plurality of main scanning pixel lines includes the edge pixel corresponding to an edge of a punch hole formed in a paper, and determines whether each of the plurality of sub-scanning pixel lines includes the edge pixel corresponding to an edge of a punch hole formed in the paper;

recognizes a number of second main scanning pixels, which is a number of pixels from a main scanning one-side pixel which is the edge pixel located farthest to one side in the main scanning direction to the edge pixel that appears subsequently to the main scanning one-side pixel when scanning from one side to the other side in the main scanning direction, for each of the main scanning pixel lines including the edge pixel corresponding to an edge of a punch hole formed in the paper;

recognizes a number of second sub-scanning pixels, which is a number of pixels from a sub-scanning one-side pixel which is the edge pixel located farthest to one side in the sub-scanning direction to the edge pixel that appears subsequently to the sub-scanning one-side pixel when scanning from one side to the other side in the sub-scanning direction, for each of the sub-scanning pixel lines including the edge pixel corresponding to an edge of a punch hole formed in the paper;

obtains an average value of the numbers of second main scanning pixels of a specific number of the main scanning pixel lines in descending order of the number of second main scanning pixels, and obtains an average value of the numbers of second sub-scanning pixels of the specific number of the sub-scanning pixel lines in ascending order of the number of second sub-scanning pixels; and includes the average value of the numbers of second main scanning pixels and the average value of the numbers of second sub-scanning pixels, in the paper information as information indicating a punch hole position of the punch paper read by the reader.

13. The image forming apparatus according to claim 11, wherein when determining that the paper read by the reader is a punch paper, the controller:

determines a number of punch holes of the punch paper read by the reader on a basis of a multiplication value of the average value of main scanning edges and the average value of sub-scanning edges; and includes information indicating the determined number of punch holes in the paper information.

14. The image forming apparatus according to claim 13, wherein the operation panel accepts an operation of inputting a number of punch holes as the search operation, and wherein when a number of punch holes is input in the search operation, the controller causes the operation panel to display the history information corresponding to the paper information including the information indicating the number of punch holes input in the search operation.

* * * * *